United States Patent [19]
Nikolits et al.

[11] 3,800,369
[45] Apr. 2, 1974

[54] FASTENER FLASH MOLDED INTEGRAL WITH PARENT PART

[75] Inventors: Ronald F. Nikolits, Livonia; Thomas J. Kane, Dearborn, both of Mich.

[73] Assignee: Ford Motor Company, Dearborn, Mich.

[22] Filed: Sept. 1, 1972

[21] Appl. No.: 285,691

[52] U.S. Cl.............................. 24/221 R, 24/73 RM
[51] Int. Cl............................................. A44b 17/00
[58] Field of Search............ 24/221 R, 73 D, 73 HS, 24/73 P, 73 PF, 73 PM, 73 RM, 221 A; 85/5

[56] References Cited
UNITED STATES PATENTS

| 3,568,263 | 3/1971 | Meehan | 24/221 |
|---|---|---|---|
| 969,325 | 9/1910 | Bacon | 24/221 R |
| 3,122,804 | 3/1964 | Stawinski | 24/73 HS |
| 2,260,048 | 10/1941 | Newell | 24/221 R |
| 3,407,454 | 10/1968 | Myatt | 24/221 R |
| 3,443,783 | 5/1969 | Fisher | 24/221 R |
| 3,575,370 | 4/1971 | Morris et al. | 24/73 P |

*Primary Examiner*—Bobby R. Gay
*Assistant Examiner*—Kenneth J. Dorner

[57] ABSTRACT

A simultaneously molded first panel and severable fastener for use in being joined to another panel. The fastener is carried on the first panel in the unsevered condition by molded links, easily severable upon twisting of the fastener to engage camming means integrally molded also on the first panel. During the twisting action, the fastener is moved into a locking position in which the panels are drawn together tightly in a fastened condition. The fastener has cantilevered arms to flexibly apply force to the panels and the panels have spacers therebetween to allow the panels to flex under the influence of the forces transmitted by the fastener arms.

10 Claims, 9 Drawing Figures

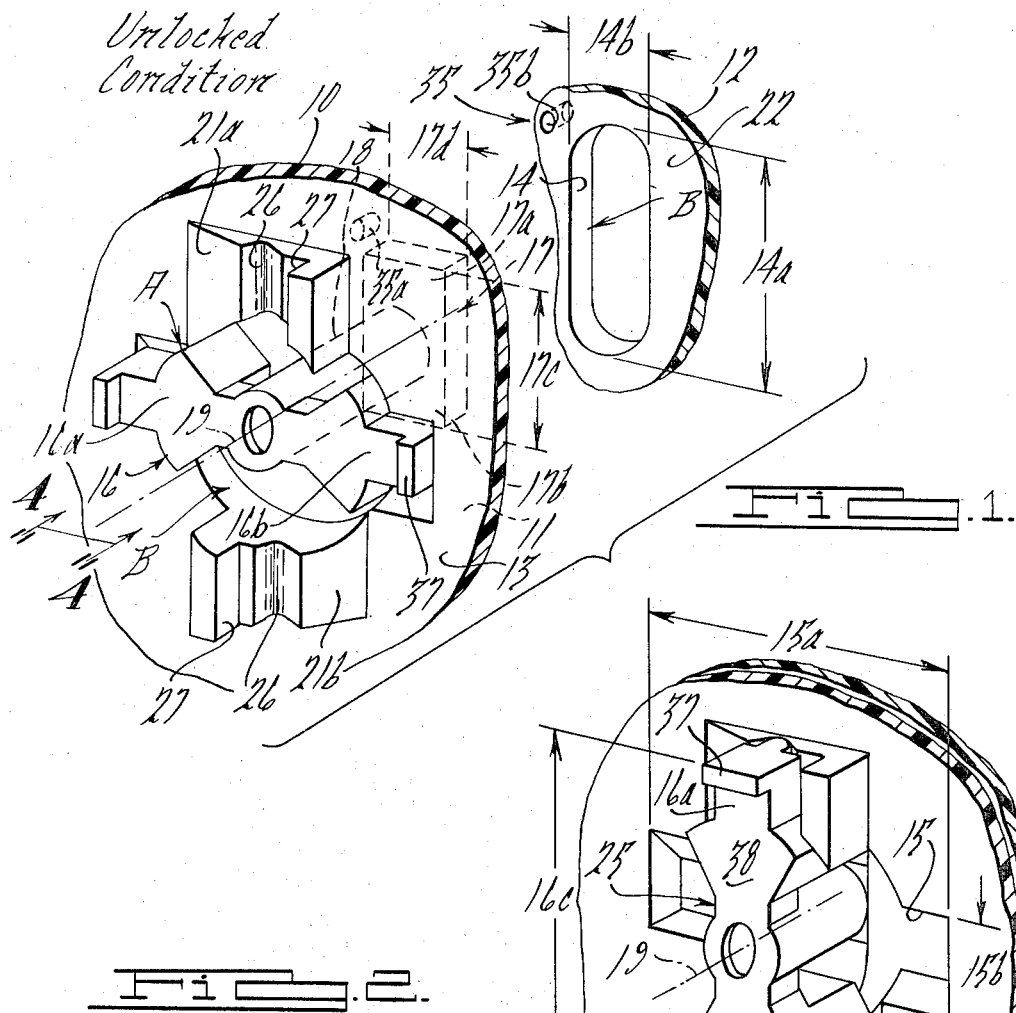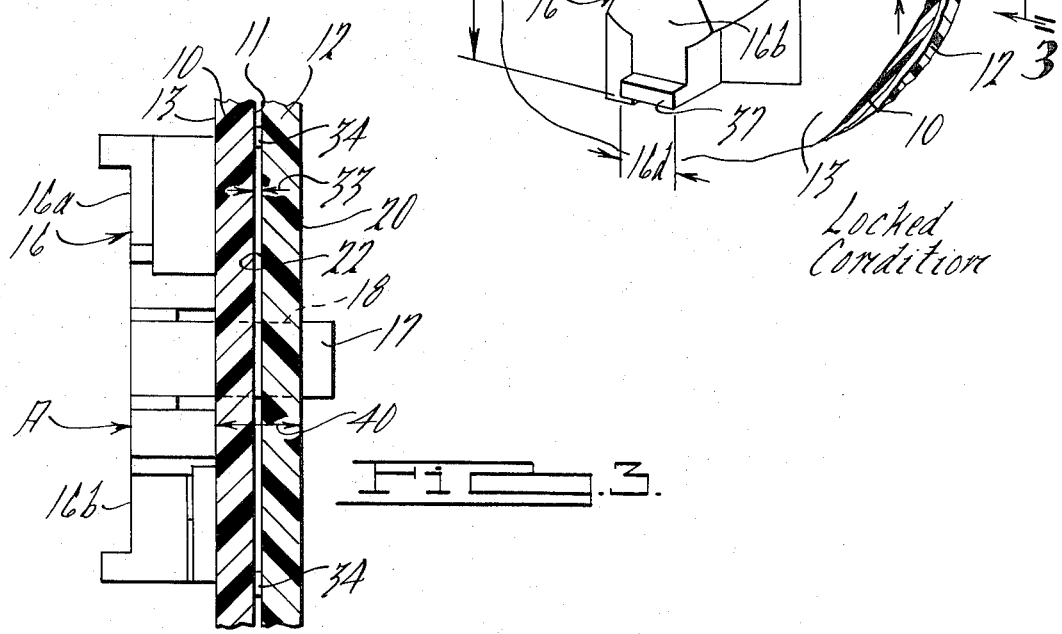

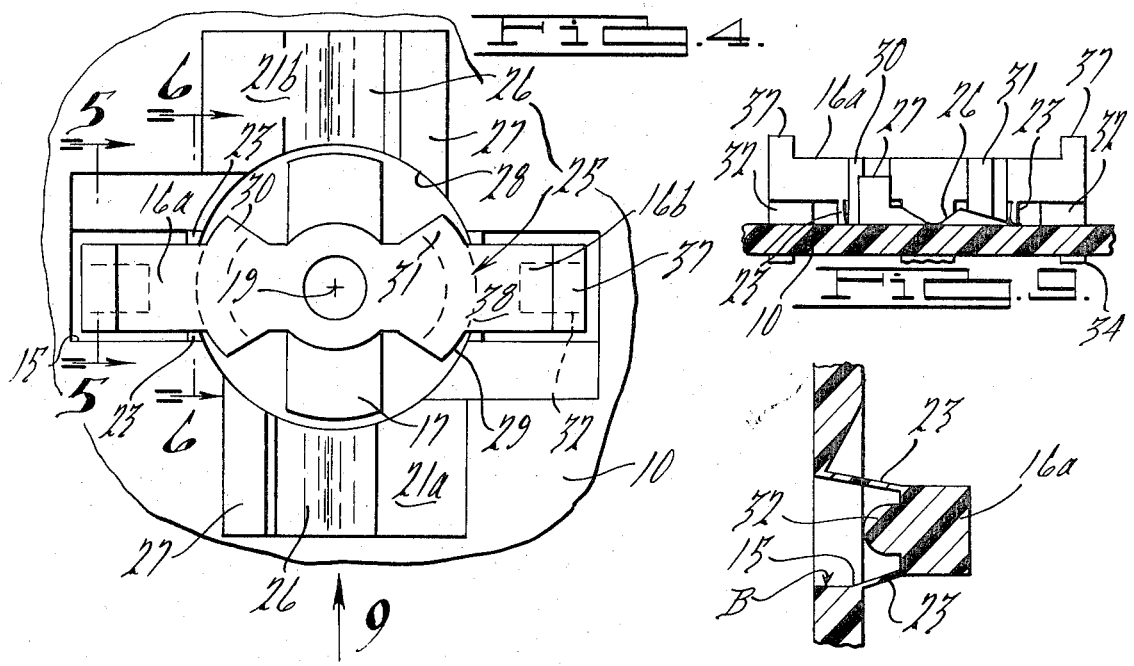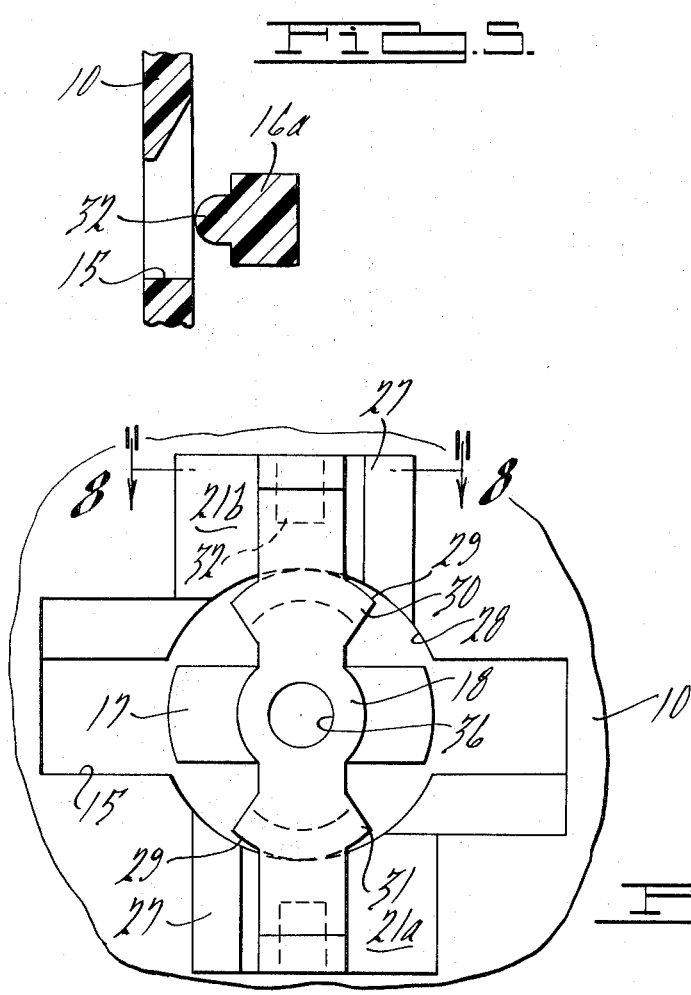

FASTENER FLASH MOLDED INTEGRAL WITH PARENT PART

SUMMARY OF THE INVENTION

Many varied fastening applications for vehicles are restricted in design due to mass assembly techniques and indeed may result in the allowability of only one type of fastener means. Under most conditions, mechanical means are required and desired in automotive applications because of their superior operational efficiency. Invariably such mechanical means take the form of independent articles not dependent on the design of the members to be fastened. The independency extends to female means which in many cases must be provided to accompany the male fastening means. The fasteners have become highly sophisticated and complex in order to achieve containment of both the male and female means together and thereby at least provide dependency between these two parts, such as taught in U.S. Pat. No. 3,568,263. All of this has lead to an increase in the cost factor as well an increase in the variety of designs causing inventory and assembly problems.

To overcome the economic and practical problems, the invention contemplates a severable fastener designed to accompany the member to be fastened by being molded or fabricated at the time such panel or member is constructed. It is most important that severability be provided by means which is effective to shear upon the movement of the male fastening means in a rotary motion whereby an improved severance can be obtained with easier motion. In addition, simultaneous molding should provide for definition of such structural features as: (a) self-centering surfaces to guide the severing motion as well as to enable the fastener to be reused if the assembly is dismantled and then reassembled, (b) additional guide surfaces to receive an automated tool providing the motion necessary to control the fastener movement, and (c) the definition of a fastener means which is hollow thereby increasing torsional strength.

More and more elements or panels in appliances, particularly in automotive vehicles, are molded of plastic material allowing great freedom of form. This material has inherent flexibility which has been utilized by this invention as a virtue whereby flexure is promoted in two locations (a) in the arms of the severable fastener portion when finally engaged in the fastened condition, and (b) in the plastic panels or members to be joined so that they may work in flexible opposition to the flexure of the fastener arms.

SUMMARY OF THE DRAWINGS

FIG. 1 is an exploded view of a portion of two panels with the integral fastening means shown on one of the elements prior to assembly;

FIG. 2 is the view similar to FIG. 1 with the panels in the fastened position and the fastening element in the locked condition;

FIG. 3 is a side elevational view of the view shown in FIG. 2;

FIG. 4 is a frontal view taken along the line 4—4 of FIG. 1;

FIG. 5 is a fragmentary sectional view taken along line 5—5 of FIG. 4;

FIG. 6 is a fragmentary sectional view taken along line 6—6 of FIG. 4;

FIG. 7 is a view similar to that of FIG. 4 illustrating the fastener in the locked condition;

FIG. 8 is a fragmentary sectional view taken along line 8—8 of FIG. 7; and

FIG. 9 is a view taken along line 9—9 of FIG. 4.

DETAILED DESCRIPTION

A preferred embodiment is illustrated in a first preparatory condition in FIGS. 1 and 4 and in an operative locked condition in FIGS. 2 and 7; they shall be referred to commonly except wherein specific sectional views are of help or movements are important. A first lockable panel or member 10 is shown spaced from a second panel or member 12, each preferably formed as a single ply of material comprised of plastic such as polypropylene. Panel 10 has one side 11 adapted to mate or fit in juxtaposed position relative to panel 12 and has another side 13 adapted to be exposed in the final assembled position (see FIG. 3). Male fastening means A is carried in the unsevered condition on panel 10 as shown in the position of FIGS. 1, 4 and 6. Female fastening means B is provided on at least panel 12 in the form of an opening 14 and further includes means on panel 10 in the form of an opening 15.

The male fastening means A principally comprises an element 25 having a pair of arms 16 and 17 extending transversely at opposite ends of a shank 18 which commonly connects said arms. Each arm has portions extending outwardly to opposite sides of the shank (16a, 16b and 17a, 17b).

When viewed along the axis 19 of the shank, arm 16 is at a right-angle (90°) to the arm 17. Arm 16 forms one portion of the fastening means which is designed to be disposed adjacent side 13 of panel 10 and arm 17 is designed to lie adjacent side 20 of the panel 12 when assembled (or when unassembled to lie adjacent the side 11 of panel 12). The positioning of the male means in the unassembled condition is assured by severable portions or fingers 23 which integrally join the arm 16 to the sides of opening 15 (see FIG. 6). The fingers are intentionally very thin so that twisting (preferably arcuate movement greater than 45°) of the male means about axis 19 can easily break them and completely sever the male means for assuming a locking position in the fully assembled position.

Female means firstly comprises noncircular openings 14 and 15 which are each generally of an oblong shape. Opening 15 has a longitudinal extent 15a and width 15b, each dimension being greater than similar dimensions 16c and 16d of arm 16 (when viewed along axis 19) so that arm 16 may pass freely therethrough when aligned with the opening 15. Opening 14 has a longitudinal dimension 14a greater than the length 17c of the arm 17 and a width 14b greater than the width 17d of arm 17. Sizing of opening 14 certainly is necessary to permit assembly of the panels whereby juxtaposition of panel 12 can be arranged adjacent panel 10 requiring element 25 to pass through the opening 14 to gain access to side 20 of panel 12 for exerting locking forces when made operative. The sizing of openings 14 and 15 is important in order to permit disassembly of element 25 from either side of the assembly. This is particularly helpful when access is limited by the embodiment and yet there is a need to remove and reinstall a panel. This is facilitated, for example, when panel 12 is desired to remain stationary and panel 10 is the member desired to be removed and remounted. To this end, element 25 may be returned to its original rotary position having arm 16 aligned with opening 15 thereby permitting withdrawal of the panel 10.

To promote a mechanical fastening force simply as a result of arcuate movement of element 25 to allow the arms of element 25 to urge the panels together, a camming means 21 is employed. Means 21 comprises a ramp 21a and a ramp 21b each effective to lie in the path of arcuate movement (clockwise as indicated in FIG. 1) of the arm portion 16a and 16b respectively. The ramps urge the arm 16 away from panel 12 (along axis 19); panel 12 restrains the arm 17 from movement along axis 19. To lock, element 25 is stopped (after the desired amount of rotation has been achieved, here preferably a quarterturn of 90°) against stops 27 defined on camming means 21 to restrain the arms 16 against further rotary movement. Seats 26 are provided to restrain the arms against return rotary movement whereby rounded noses 32 defined on the arm 16 may seat therein. To assure smooth rotary motion during the twisting operation, guide surfaces 28 are provided which comprise an enlarged annular opening concentrically defined about the center of the opening 15 and thereby aligned with axis 19; complementary surfaces 29 are arranged on a pair of spaced legs 30 and 31 depending from the arm 16 and adapted to engage surfaces 28 for rotary sliding movement therealong (even though shown somewhat separated in FIGS. 4 and 7 for ease of illustration). Guide surfaces 28 and 29 are particularly effective to insure ease of reassembly once the element 25 has been withdrawn.

A predetermined amount of flexure is designed to take place in both the arms 16 and 17, as well as a predetermined portion of the panels 10 and 12 and the combination is among the important features of the present invention. The flexure in arms 16 and 17 is provided by arranging the arms as cantilever members which apply force along the extremity of the arm remote from the shank 18. This is further facilitated by the composition of the arms being of a plastic nature thereby providing an inherent degree of flexibility. In addition, the panels 10 and 12 are arranged to be spaced apart a slight distance 33 by a plurality of dimples or other types of protrusions 34 molded on one of the panels on a side adapted to be mated together. In the preferred embodiment, the protrusions are arranged concentrically about the opening 15 and are on the panel 10. This allows the portion of the panel 10 and 12 marginally about the openings to flex within the limits of the space or dimension 33 in response to a force applied from the exterior such as by arms 16 and 17.

Another feature of the invention is the ability of the assembly to resist shear in a fully locked position. To this end, the shank 18 is constructed with a hollow interior 36 more effective to resist shear along the plane of the panels.

The diameter of shank 18 is approximately ⅓ the dimension of arm portions 16a or 16b to insure a sufficient degree of arm flexibility.

To further assist in the resistance of shear forces, locator means 35 is integrally defined on one or more of the panels preferably comprising integral pins 35a spaced at remote locations on the panel effective to mate with snug openings 35b in the mating panel. The mating of pins 35a in openings 35b align the panels and removes shear forces from the fastener element to provide a more stable assembly.

In operation, panel 10 is carried to the panel 12, the latter being a mounting member or a permanently fixed element on a more comprehensive assembly. Panel 10 has the element 25 integrally carried thereon by fingers 23 in the position shown in FIGS. 1 and 6. Arm 16 is aligned with opening 15 and arm 17 is at right angles thereto; thus opening 14 must also lie at right angles to the opening 15 to permit the initial passage of element 25 therethrough allowing panel 12 to contact the spacing means 34. When panels 10 and 12 are in the position shown in FIG. 3, element 25 is twisted either manually or by an automated tool (not shown). The tool may contact tool guide shoulders 37 as well as the top surface 38 of the element. The element is turned clockwise as viewed in FIG. 1 bringing noses 32 of the arm portions 16a and 16b into engagement with the ramps 21a and 21b respectively and bringing the arm 17a more closely against the opposite side 20 of panel 12. During this initial motion, arm 17 is moved from an aligned to a disaligned position relative to opening 14. Conversely, arm 16 is brought from an aligned to a disaligned position relative to opening 15.

During a part of this rotary motion, fingers 23 are severed due to the extent of rotary motion and to the slight longitudinal movement along axis 19; in any event, fingers 23 are ruptured and element 25 becomes an independent agent effective to be moved to its final twisted position as shown in FIGS. 2 and 7. In the final position, the noses 32 have moved over the ramps 21 and are seated within the seats 26. The bottom depth of each of the seats 26 is defined so that the arms 16 and 17 are spaced apart a slightly greater distance 40 than their initial relaxed dimension. Flexure in both the arms and panels results in the application of resilient locking forces to hold the panels together.

We claim as our invention:

1. A joinable article for mounting on a supporting member having at least one mounting opening, said article comprising:
   a lockable panel having at least one side for mating with said member and at least one exposed side, said panel further having at least one flexible portion,
   means defining a severable locking element integrally carried on said panel in spaced relation thereto and adjacent said flexible portion, said element having opposed portions for mechanically engaging said supporting member and panel portion, when the latter are brought together for fastening.

2. An article as in claim 1, in which said element undergoes arcuate movement to be severed from said panel and provide for said fastening, said flexible portion being flexed by said element in the severed condition to promote a tighter mechanical attachment.

3. An article as in claim 1, in which said means is positionable to extend toward each of said member and panel upon mating theretogether, with one opposed portion adjacent the panel exposed side and the other opposed portion adjacent the member, whereby upon a predetermined twisting of said element the integral carriage of said locking element is severed permitting said portions to engage said panel and member for completing said mechanical fastening.

4. An article as in claim 1, in which said means defining a locking element comprises a pair of flexing arms constituting said opposed portions and a shank interconnecting said arms, one of said arms being shaped to pass through said supporting member opening when the locking element is oriented in one position to the opening and non-passable when the element is oriented in another position to the opening, said panel being particularly characterized in that said element is commonly molded and integrally carried by said panel in said one position and independently carried by both said panel and supporting member when said element is in said other position.

5. A fastener assembly comprising:
first and second plies of material each having at least one noncircular opening, said plies being juxtaposed with the peripheries of said openings in general alignment about a line passing commonly through said openings,
male fastening means integrally carried on said first ply of material having opposed flexing arms connected for arcuate movement about an axis passing transversely through each of said arms, said fastening means having at least one severable portion locating said connection axis generally aligned with the line passing through said openings and with one arm each disposed on opposite sides of said juxtaposed plies of material,
means on both said plies of material for flexing said arms upon a predetermined degree of arcuate movement about said connecting axis thereby to break said severable portion, the flexed arms applying forces to said plies of material to maintain them together.

6. A fastener assembly as in claim 5, in which one of said plies have an opening effective to permit passage of both said arms therethrough, and the other ply having an opening effective to permit passage of only one of said arms.

7. A fastener assembly as in claim 5, in which at least one of said plies of material have means effective to space said plies of material apart when juxtaposed whereby upon flexing of said arms said plies of material will be flexed also by being free to move within the space provided by said spacing means.

8. A fastener assembly as in claim 5, in which said flexing arms are at an angle relative to each other when viewed along said axis, and a hollow shank for providing said connection between said arms.

9. A molded panel having self-contained locking capability, comprising:
a functional plastic panel defining a first plane on one side thereof independent of said locking capability and having an opening therethrough; means defining at least one integrally molded locking element on said panel having a shank extending spacedly from and through said opening and carrying a lock insertable from said one side for disposition on the other side of said panel, said element having at least one rupturable finger supporting said arm on said panel in a manner so that upon angular movement of said shank about an axis transverse to said plane said finger is broken and said arm is caused to move against said one side of said panel for drawing said shank and lock toward said one side.

10. A molded panel as in claim 9, in which said ply of material has camming means effective to move said arm away from said ply material during said angular movement.

* * * * *